United States Patent [19]

Maeda

[11] Patent Number: 4,798,391
[45] Date of Patent: Jan. 17, 1989

[54] THREE-PIECE OIL-RING WITH A SLOT

[75] Inventor: Yorishige Maeda, Toyota, Japan

[73] Assignee: Toyota Jidosha Kabushiki Kaisha, Toyota, Japan

[21] Appl. No.: 51,169

[22] Filed: May 18, 1987

Related U.S. Application Data

[63] Continuation of Ser. No. 783,643, Oct. 3, 1985, abandoned.

[30] Foreign Application Priority Data

Dec. 28, 1984 [JP] Japan ............................. 59-179390
Dec. 30, 1984 [JP] Japan ............................. 59-180874

[51] Int. Cl.$^4$ .............................. F16J 9/06; F16J 9/20
[52] U.S. Cl. .................................... 277/139; 267/1.5;
277/141; 277/160; 277/215; 277/216
[58] Field of Search ................. 277/138–141,
277/157, 158, 160, 216, 215; 267/1.5

[56] References Cited

U.S. PATENT DOCUMENTS

| | | | |
|---|---|---|---|
| 2,025,334 | 12/1935 | Teetor | 267/1.5 |
| 2,112,425 | 3/1938 | Nixon | 267/1.5 |
| 2,789,872 | 4/1957 | Olson. | |
| 3,153,540 | 10/1964 | Naperala et al. | 277/139 X |
| 3,338,582 | 8/1967 | DeBruin. | |
| 3,346,252 | 10/1967 | Saylor | 277/139 X |

FOREIGN PATENT DOCUMENTS

| | | | |
|---|---|---|---|
| 604880 | 9/1960 | Canada | 277/140 |
| 1085733 | 7/1960 | Fed. Rep. of Germany | 277/140 |
| 7536355 | 8/1976 | Fed. Rep. of Germany. | |
| 1374228 | 8/1964 | France | 277/140 |
| 57-38956 | 3/1982 | Japan. | |
| 0773268 | 4/1957 | United Kingdom | 277/140 |
| 810247 | 3/1959 | United Kingdom | 277/139 |

Primary Examiner—Allan N. Shoap
Attorney, Agent, or Firm—Cushman, Darby & Cushman

[57] ABSTRACT

A three-piece oil-ring comprises a pair of side rails and an expander disposed between the side rails. The expander extends in a circumferential direction and has waves in a radial direction. At both sides of radially inner portions of the expander side rail engaging portions protrude in an axial direction and extend in a circumferential direction. A slot in the expander is provided between the paired side rail engaging portions. The slot may have a rib at a longitudinally central portion of the slot. Due to the slot and the rib, the oil-ring can have an appropriate rigidity, thereby decreasing oil consumption.

6 Claims, 6 Drawing Sheets

THREE-PIECE OIL-RING WITH A SLOT

This is a continuation of application Ser. No. 783,643, filed Oct. 3, 1985 which was abandoned upon the filing thereof.

BACKGROUND OF THE INVENTION

1. Field of the Invention

The present invention relates to a three-piece oil-ring consisting of a pair of side rails and an expander provided between the paired side rails.

2. Description of the Prior Art

Three-piece oil-rings have been known including a pair of side rails separated by an expander extending in a circumferential direction with waves in a radial direction. Both ends of the expander are opposed to each other. Side rail engaging portions of the expander are formed on both sides, axially, of radially inner portions of the expander so as to protrude in an axial direction and to extend in a circumferential direction. The side rail engaging portions are engaged with inside surfaces of the pair of side rails, thereby transmitting the expanding spring force of the expander to the paired side rails, pushing the paired side rails slildably against a cylinder bore surface.

In the composite oil-ring including the above-mentioned radially waving expander, since the expander itself has rigidity, the side rail engaging portions formed on opposite sides of flat portions at the radially inner portions of the expander cause each other to deform. Also, typical cylinder bores do not have perfectly straight axial walls. Therefore, one of the paired side rails may contact the cylinder bore surface while the other one does not. The result is an increase in oil consumption.

Since this problem arises due to the fact that the side rail engaging portion at one side of the expander is deformed by the opposite side rail engaging portion, various inventions to reduce rigidity of the expander have been proposed. For example, Japanese Utility Model Publication SHO 57-38956 discloses a composite oil-ring wherein spring arms extend from both upper and lower portions of an expander and tip portions of the arms contact an inside surface of a rail ring and expand while a center portion of the rail ring is supported by a waving portion of the expander.

In the above composite oil-ring, since a rail engaging portion has very low rigidity, the rail engaging portion at one side of the expander receives little deforming influence from the opposite rail engaging portion. However, since the rigidity of the rail engaging portion is very low, fluttering due to a resonant phenomenon may happen at high engine speeds, causing an increase in oil consumption. As is apparent from the above description, the rigidity of the side rail engaging portion is required to be set not too high and not too low to minimize oil consumption.

OBJECTS AND SUMMARY OF THE INVENTION

An object of the present invention is to provide a three-piece oil-ring including a pair of side rails and an expander disposed between the paired side rails, wherein each one of the paired side rails can follow a cylinder bore surface at time of engine operation independently from the other side rail and the expander has a moderate rigidity to prevent a resonant phenomenon.

The three-piece oil-ring according to the present invention satisfies the above object and is intended to be disposed in an oil-ring groove formed in a piston which is inserted to move reciprocally in a cylinder. The oil-ring according to the present invention comprises a pair of side rails and an expander disposed between the paired side rails so as to expand the side rails. The expander extends in a circumferential direction and has waves in a radial direction. The expander is provided with side rail engaging portions at axially opposite sides of radially inner portions of said expander. The expander also has slots, one formed at an axially central portion of the expander between each pair of side rail engaging portions.

In the above three-piece oil-ring, a rib may be provided at a longitudinally central portion of each slot, the rib extending between the longitudinal sides of each slot to form two smaller slot portions.

In the three-piece oil-ring thus constructed, since the expander has a slot, each of the paired side rail engaging portions receives a weakened influence from the other. This means that the paired side rail engaging portions can freely move independently from each other even if piston slap occurs or the cylinder bore is not straight. As a result, the side rails may follow the cylinder bore more easily and oil consumption is decreased.

When the rib is provided at the slot, upward or inward deformation of the slot and the side rail engaging portions can be prevented. As a result, reduction in pushing force of the side rail engaging portions which pushes the side rails to the cylinder bore is suppressed, thereby preventing deterioration of oil consumption.

BRIEF DESCRIPTION OF THE DRAWINGS

The above and other objects, features and advantages of the present invention will be become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

Some preferred embodiments of the present invention will be described hereunder refering to the attached drawings.

Figure 1:
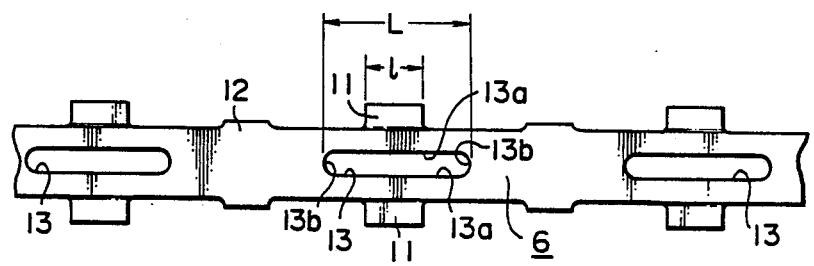
FIG. 1 is a partial elevational view of an expander of a three-piece oil-ring according to a first embodiment of the present invention.
Figure 2:
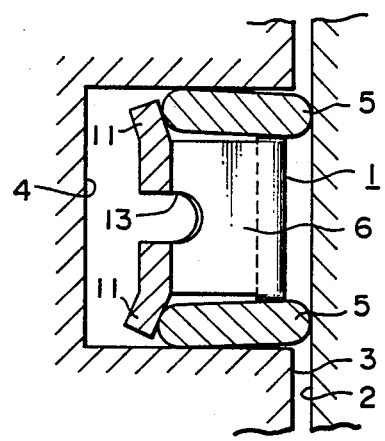
FIG. 2 is a sectional view of the three-piece oil-ring and its vicinity according to the first embodiment of the present invention.
Figure 3:
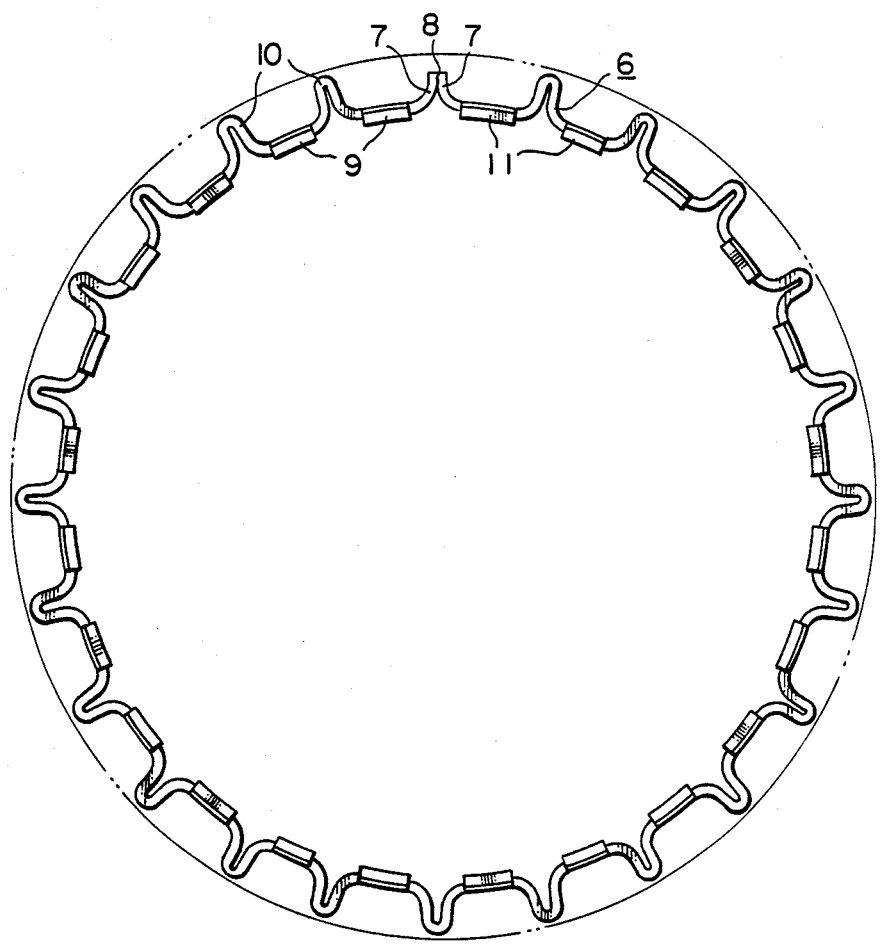
FIG. 3 is an entire plan view of the expander of the three-piece oil-ring according to the first embodiment of the present invention.

FIGS. 1 to 7 illustrate a three-piece oil-ring according to a first embodiment of the present invention. As shown in FIG. 2, a three-piece oil-ring is disposed in an oil-ring groove 4 formed in a piston 3 which is reciprocally positioned in a cylinder 2 of an internal combustion engine.

Three-piece oil-ring 1 consists of a pair of side rails 5, 5 spaced from each other in an axial direction and an expander 6 disposed between paired side rails 5,5 so as to expand side rails 5,5 by the spring force of expander 6.

Figure 5:
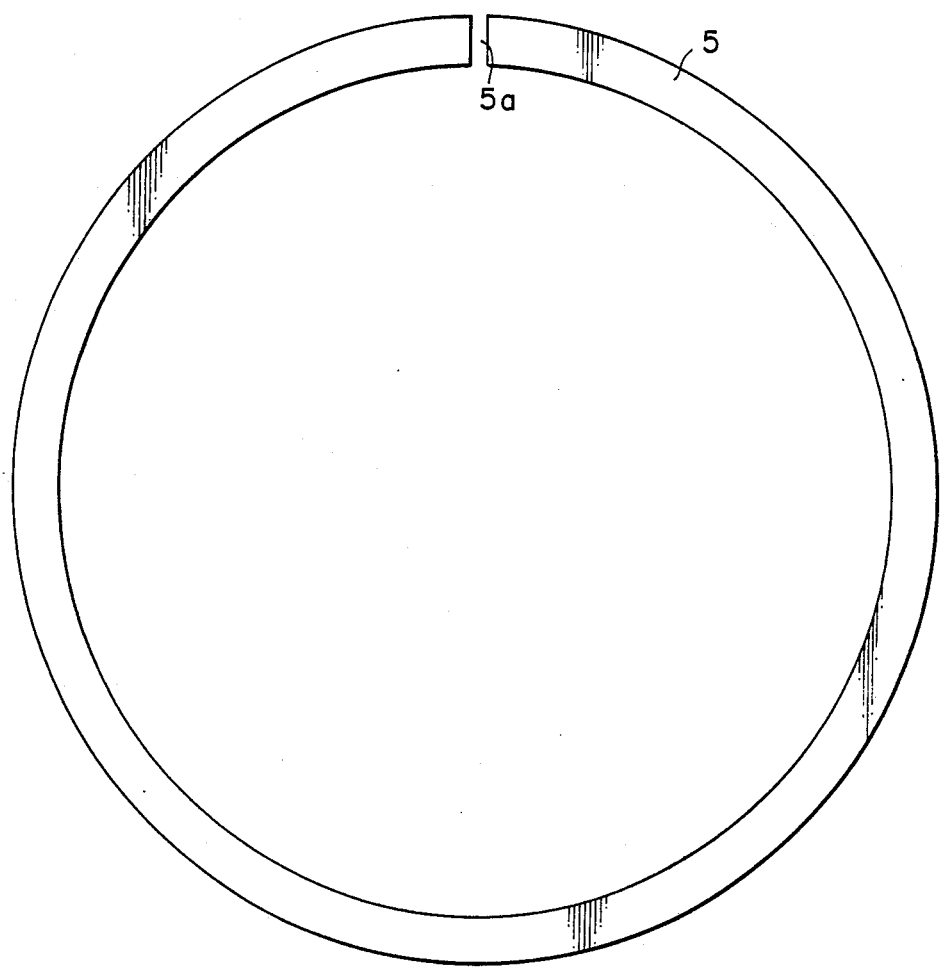
FIG. 5 is a plan view of a side rail of the three piece oil-ring according to the first embodiment of the present invention.

As shown in FIG. 5, side rail 5 consists of an elastic metallic annular strip abutted at the ends and has a gap 5a of the abutted portion.

Figure 4:
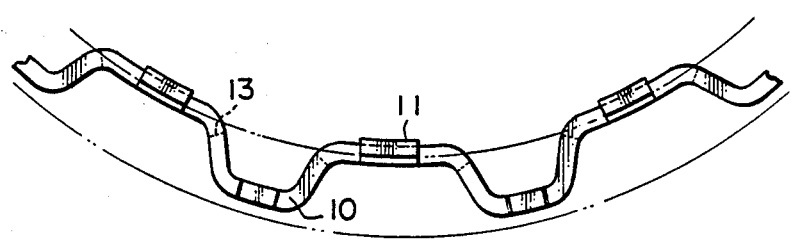
FIG. 4 is a partial plan view of the expander of the three-piece oil-ring according to the first embodiment of the present invention.

As shown in FIGS. 1 and 4, expander 6 is constructed of an annular strip abutted at the ends at a position 8 on its circumference. Expander 6 extends in a circumferential direction and has waves in a radial direction. Epxander 6 includes a plurality of flat portions at radially inner portions of the waves and a plurality of curved portions at radially outer portions of the waves. At both axial sides of radially inner portion 9 are formed side rail engaging portions 11,11 which protrude in an axial direction and extend in a circumferential direction. Side rail engaging portion 11 is integrally connected to an axially central portion 12 of expander 6. A radially outside surface of side rail engaging portion 11 contacts a radially inside surface of each side rail 5 and transmits an expanding force of expander 6 to side rail 5.

When contacting surfaces between side rail engaging portion 11 and side rail 5 wear due to abrasion, the expanding force of expander 6 is reduced. In order to suppress the reduction of the expanding force of expander 6, it is effective to increase the contacting surface area between side rail engaging portion 11 and side rail 5 by lengthening the circumferential length of side rail engaging portion 11, that is, increasing a contacting ratio. In such an oil-ring with a high contacting ratio, a circumferential length of radially outer portion 10 of expander 6 is not so much a flat portion as a curved portion. Expander 6 of the present invention includes such an expander having radially outer portion 10 of such a curved portion.

At axially central portion 12 of radially inner portion 9, having side rail engaging portions 11,11 at both axial sides thereof, a slot 13 extends in a circumferential direction and has a length L which is longer than a circumferential length 1 of side rail engaging portion 11. Circumferentially both ends of slot 13 extend beyond both ends of side rail engaging portion 11. Slot 13 consists of a long opening having a pair of long sides 13a,13a which extend in a circumferential direction parallel to each other and a pair of curved sides 13b,13b which connect long sides 13a,13a at circumferentially both ends of sides 13a,13a. Slot 13 may be an ellipse or rectangular. Slot 13 is provided between each pair of side rail engaging portions 11,11.

Next, effects of the three-piece oil-ring according to the first embodiment of the present invention will be described.

Figure 6:
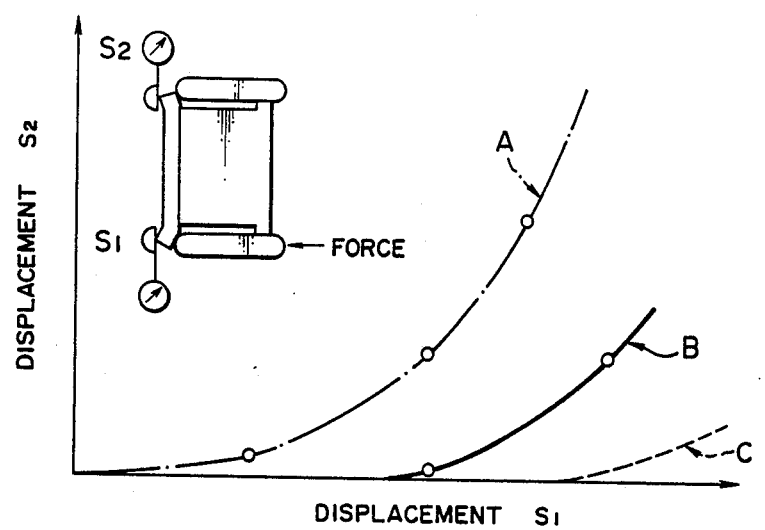
FIG. 6 is a graph showing a relationship between a displacement $S_1$ of one of paired side rails and a displacement $S_2$ of the other of the paired side rails of the first embodiment of the present invention.

As shown in FIG. 6, in an oil-ring 1 on which a normal expanding force acts, when one of paired side rails 5,5 is pushed in a radial direction, the other of paired side rails 5,5 is pushed in a radial direction and will be displaced in the radial direction. FIG. 6 shows a relationship between a radial displacement $S_1$ of one of paired side rails 5,5 when pushed and a radial displacement $S_2$ of the other of paired side rails 5,5. In FIG. 6, a chain dotted line A shows a characteristic of a conventional composite oil-ring, a continuous line B shows a characteristic of the three-piece oil-ring 1 of the present invention and a broken line C shows a characteristic of such a composite oil-ring having extreme low rigidity as disclosed in Japanese Utility Model Publication SHO 57-38956. As is apparent from FIG. 6, the three-piece oil-ring of the present invention has a moderate rigidity whose spring constant is between both extreme spring constants of curves A and C. In three-piece oil-ring 1 of the present invention, one of paired side rail engaging portions 11,11 of expander 6 is less influenced in deformation by the other of paired side rail engaging portions 11,11 than in a conventional composite oil-ring. This is due to slot 13 which weakens the influence between paired side rail engaging portions 11,11. This means that paired side rail engaging portions 11,11 can move freely in a radial direction following piston slap or any fluctuation in the straightness of a cylinder bore. This also means that side rails 5,5 can more easily follow a cylinder bore so that oil consumption is decreased.

Figure 7:
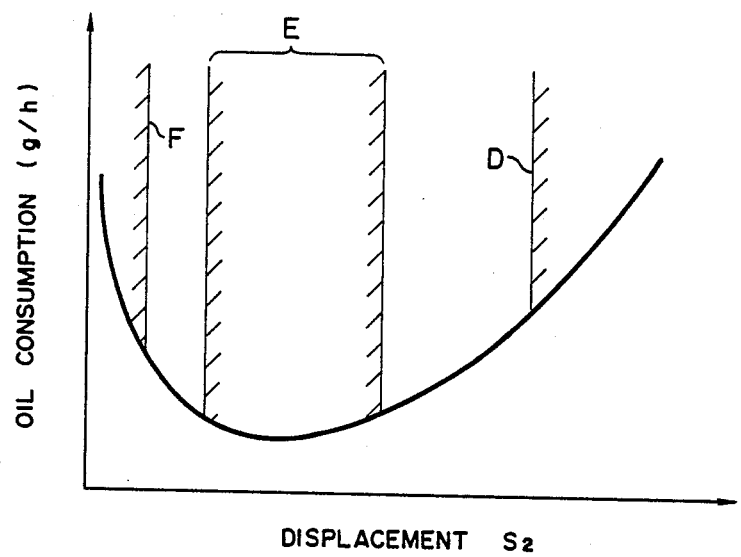
FIG. 7 is a graph showing a relationship between the displacement $S_2$ and oil consumption in the first embodiment of the present invention.

FIG. 7 shows a relationship between oil consumption and radial displacement $S_2$ of side rail 5 when a certain force acts on the other side rail 5. FIG. 7 shows that oil consumption is increased both when displacement $S_2$ is too large and when displacement $S_2$ is too small. When displacement $S_2$ is too small, that is, when axially paired side rail engaging portions 11,11 can move freely and nearly independently from each other, the spring constant of side rail engaging portion 11 pushing side rail 5 is inevitably weakened and therefore side rail engaging portions cause resonance due to fluctuations in the straightness of the cylinder bore. On the other hand, when displacement $S_2$ is too large, that is, one side rail engaging portion 11 easily receives an influence from the other side rail engaging portion 11, side rail 5 detaches from the surface of the cylinder bore during high engine speeds.

As shown in FIG. 7, according to the present invention, since displacement $S_2$ is in a moderate range E, oil consumption is maintained low.

FIGS. 8 to 12 show a second embodiment of the present invention. The structure of the second embodiment of the present invention is substantially the same as that of the first embodiment of the present invention except the structure of the slot provided between a pair of side rail engaging portions and the vicinity thereof. Therefore, in the second embodiment, the description about the same structure as in the first embodiment will be omitted, the same reference numbers will be employed for the same elements as in the first embodiment, and only differences in structure will be described.

Figure 10:
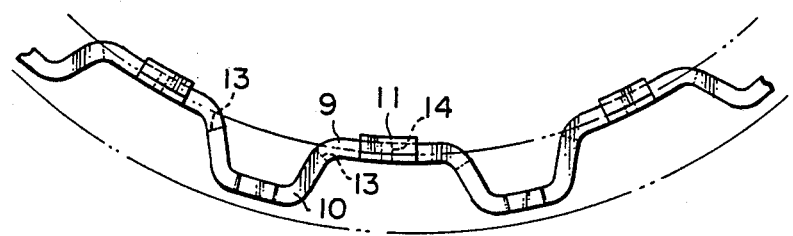
FIG. 10 is a partial plan view of the expander of the three-piece oil-ring according to the second embodiment of the present invention.
Figure 8:
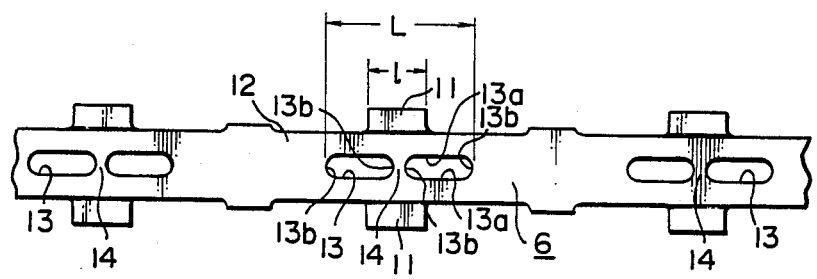
FIG. 8 is a partial elevational view of an expander of a three-piece oil-ring according to a second embodiment of the present invention.
Figure 9:
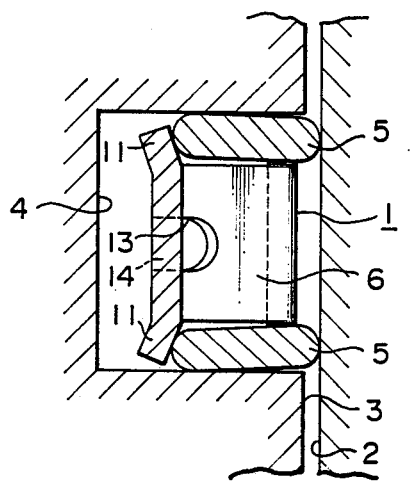
FIG. 9 is a sectional view of the three piece oil-ring and its vicinity according to the second embodiment of the present invention.

In FIG. 8 to 10, slot 13 is provided between paired side rail engaging portions 11,11. At a longitudinally central portion of slot 13 at least one rib 14 extends from one side 13a to the other side 13a of slot 13. Rib 14 is integrally connected to axially central portion 12 of expander 6. A plurality of ribs 14 may be provided at each slot 13. Slot 13 is divided into at least two slot portions 13-1, 13-2 by rib 14.

The following relationship between width b of rib 14 and a thickness t of a plate constituting expander 6 is desirable:

$$t \leq b \leq 3t$$

If width b is smaller than expander thickness t, rib 14 becomes weak, while if width b is larger than 3t, the rigidity of expander 6 becomes too large. Rib 14 is provided at each slot 13.

Next, effects of the second embodiment will be described.

Figure 11:
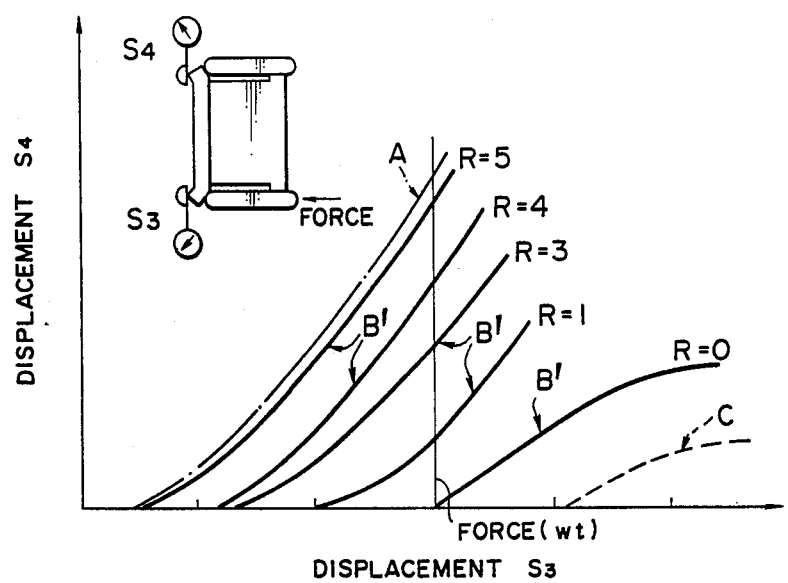
FIG. 11 is a graph showing a relationship between a displacement $S_3$ of one of paired side rails and a displacement $S_4$ of the other of the paired side rails of the second embodiment of the present invention.

FIG. 11 shows a relationship between a radial displacement $S_3$ of one or paired side rails 5,5 and a radial displacement $S_4$ of the other of paired side rails 5,5 when one side rail 5 is statically pushed in the radial direction. In FIG. 11, a chain dotted line A shows a characteristic of a conventional composite oil-ring, a continuous lines B' show a characteristics of the second embodiment of the present invention and a broken line C shows a characteristic of the composite oil-ring Japanese Utility Model Publication SHO No. 57-78956. Further, FIG. 11 shows various characteristics when a ratio R of rib width b to expander plate thickness t is variously changed. As is apparent from FIG. 11, three-piece oil-ring 1 of the second embodiment of the present invention has a moderate spring characteristic B' between both extreme characteristics A and C. When ratio R is varied by varying rib width b, displacement $S_4$ can be changed and can be set at the most appropriate value.

Figure 12:
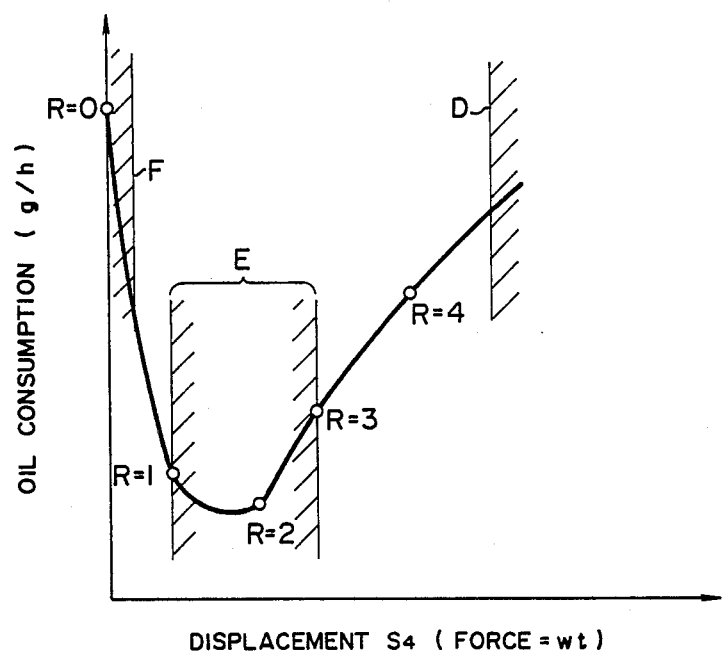
FIG. 12 is a graph showing a relationship between the displacement $S_4$ and oil consumption of the present invention.

FIG. 12 shows a relationship between oil consumption and displacement $S_4$ when one side rail 5 is pushed by a certain radial force. As is apparent from FIG. 12, oil consumption increases both when displacement $S_4$ is too large (region D) and when displacement $S_4$ is too small (region F). This is due to the same reasons as described with respect to the first embodiment of the present invention. Since, in the second embodiment of the present invention, ratio R is maintained between 1 and 3, oil consumption can be kept very low.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included wihtin the scope of the invention as defined by the following claims.

What I claim is:

1. A three-piece oil-ring for deposition in an oil-ring groove of a piston reciprocally positioned in a cylinder comprising:
    a pair of axially spaced side rails;
    an expander disposed between said side rails to expand said side rails, said expander extending in a circumferential direction and having waves in a radial direction, said expander including radially inner portions, radially outer portions, and radially intermediate portions extending between and connecting said radially inner and radially outer portions, each said radially inner portion including a substantially flat portion extending in the circumferential direction of said expander and curved portions connecting said substantially flat portion with adjacent radially intermediate portions, said radially intermediate portions being substantially flat so as to extend substantially straight between a said curved portion of a said radially inner portion and a said radially outer portion, said expander having paired side rail engaging portions integrally formed at axially opposite sides of radially inner portions of said waves so as to contact an inner side of said paired side rails, said side rail engaging portions being formed solely along said substantially flat portions of said radially inner portions, said expander also defining at least one slot in an axially central portion of said expander, solely in said radially inner portions of said waves, between at least one of said paired side rail engaging portions, such that radially outer portions of said waves are substantially imperforate, said paired side rail engaging portions having a circumferential length less than the circumferential length of said substantially flat portions of said radially inner portions and said slot having a circumferential length at least as great as the length of said substantially flat portions of said radially inner portions so as to provide a means for allowing each side rail engaging portion of said pair to move substantially freely, radially, relative to the other, said expander further having a rib extending from one side of said slot to the other side of said slot at a longitudinally central portion of said slot corresponding to said paired side rail engaging portions, at a ratio of a width of said rib to a thickness of said expander being between 1 and 3.

2. The three-piece oil-ring as claimed in claim 1, wherein said slot is elliptical in shape, having a pair of parallel straight sides and a pair of curved sides connecting said straight sides at each end of said slot.

3. The three-piece oil-ring as claimed in claim 1, wherein said slot is longer than a circumferential length of said side rail engaging portion.

4. The three-piece oil-ring as claimed in claim 1, wherein opposite longitudinal ends of said slot extend further than corresponding circumferential ends of said side rail engaging portions in a circumferential direction of the oil-ring.

5. The three-piece oil-ring as claimed in claim 1, wherein said at least one slot is provided between each of said paired side rail engaging portions.

6. The three-piece oil-ring as claimed in claim 1, wherein each side of said rib is curved.

* * * * *